United States Patent
Shah et al.

(10) Patent No.: US 8,238,610 B2
(45) Date of Patent: Aug. 7, 2012

(54) HOMOGRAPHY-BASED PASSIVE VEHICLE SPEED MEASURING

(75) Inventors: Mubarak Ali Shah, Oviedo, FL (US); Janaka Pradeep Liyanage, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 479 days.

(21) Appl. No.: 12/642,719

(22) Filed: Dec. 18, 2009

(65) Prior Publication Data
US 2010/0158321 A1 Jun. 24, 2010

Related U.S. Application Data

(60) Provisional application No. 61/138,748, filed on Dec. 18, 2008.

(51) Int. Cl.
*G06K 9/00* (2006.01)
(52) U.S. Cl. ........................................ 382/104; 382/107
(58) Field of Classification Search .................. 382/104, 382/106, 107, 159; 348/149; 340/436, 933, 340/937; 700/1, 117
See application file for complete search history.

(56) References Cited

U.S. PATENT DOCUMENTS

| | | | | |
|---|---|---|---|---|
| 4,214,265 A | * | 7/1980 | Olesen | 348/149 |
| 5,742,699 A | * | 4/1998 | Adkins et al. | 382/107 |
| 6,628,804 B1 | * | 9/2003 | Edanami | 382/107 |
| 7,920,959 B1 | * | 4/2011 | Williams | 701/117 |
| 2009/0027500 A1 | * | 1/2009 | Elangovan et al. | 348/159 |
| 2010/0172543 A1 | * | 7/2010 | Winkler | 382/104 |

\* cited by examiner

*Primary Examiner* — Claire X Wang
(74) *Attorney, Agent, or Firm* — Jetter & Associates, P.A.

(57) ABSTRACT

An apparatus for passively measuring vehicle speed includes at least one video camera for acquiring images of a roadway upon which at least one moving vehicle travels upon, each of the images comprising a plurality of pixels. A computer processes pixel data associated with the plurality of pixels, including using an adaptive background subtraction model to perform background subtraction on the pixel data to identify a plurality of foreground pixels, extracting a plurality of blobs from the foreground pixels, and rectifying the blobs to form a plurality of rectified blobs using a homography matrix. The homography matrix is obtained by comparing at least one known distance in the roadway with distances between the pixels. Using a planar homography transform, the moving vehicle is identified from the plurality of rectified blobs, wherein the respective ones of the plurality of rectified blobs include vehicle data associated with the moving vehicle. The speed of the moving vehicle is computed from the vehicle data.

16 Claims, 2 Drawing Sheets

HOMOGRAPHY-BASED PASSIVE VEHICLE SPEED MEASURING

CROSS REFERENCE TO RELATED APPLICATIONS

This application claims the benefit of Provisional Application Ser. No. 61/138,748 filed Dec. 18, 2008, which is herein incorporated by reference in its entirety.

FIELD OF THE INVENTION

Disclosed embodiments relate to determining the speed of moving objects such as vehicles from a remote location, and more particularly, to passive speed detection based on video imaging.

BACKGROUND

Vehicle speed detection has been generally based on radar gun systems. Radar guns typically use the emission and detection of reflected electromagnetic waves from the object being interrogated. The relative velocity of the object can then be determined by the Doppler Effect on the reflected waves due to the motion of the vehicle. The Doppler Effect shifts the frequency of the radar reflection based on the relative velocity (speed) of the "target", allowing for the direct and generally accurate measurement of the speed of a moving vehicle.

However, there are some known problems with radar guns. First, for speed to be accurately calculated, the moving object of interest should be the only moving object in the beam path of the radar gun. If this is not the case, it is not possible to determine which object's speed the system is reading. Second, the incident angle of the beam path of the radar gun to the object can also affect the array of the measurement. This includes angles on horizontal and vertical planes. Third and perhaps most importantly, the active electromagnetic emissions required in such systems, even in the case of laser emitting systems, can be detected by commercially available radar detectors procured by motorists purposefully trying to evade speed limit enforcement efforts. Fourth, radar guns generally do not provide multiple lane support. That is a radar gun generally only measures the speed of one vehicle at a time.

Some have suggested use of passive speed detection systems including one or more cameras, thus being without an electromagnetic wave emission source, to determine the speed of a moving vehicle. However, the use of camera images generally requires interpretation of the motion of a 3-dimensional (3D) object through 2-dimensional (2D) images provided by the camera(s). A significant problem with such an approach is that the 3D information of the vehicle is projected or nonlinearly transformed into 2D information. Hence, techniques or methods are needed to obtain 3D information despite the fact that only 2D information is available. Moreover, such systems generally lack multiple lane support.

SUMMARY

Apparatus and related methods for passively measuring vehicle speed. The apparatus includes at least one video camera for acquiring images of a roadway upon which at least one moving vehicle travels upon, each of the images comprising a plurality of pixels. A computer processes pixel data associated with the plurality of pixels, and uses an adaptive background subtraction model to perform background subtraction on the pixel data to identify a plurality of foreground pixels, extracts a plurality of blobs from the foreground pixels, and then rectifies the blobs to form a plurality of rectified blobs using a homography matrix.

The homography matrix is obtained by comparing at least one known distance in the roadway with distances between the pixels. Using a planar homography transform, the moving vehicle is identified from the plurality of rectified blobs. The respective ones of the plurality of rectified blobs include vehicle data associated with the moving vehicle. The speed of the moving vehicle is computed from the vehicle data.

DETAILED DESCRIPTION

Figure 1:
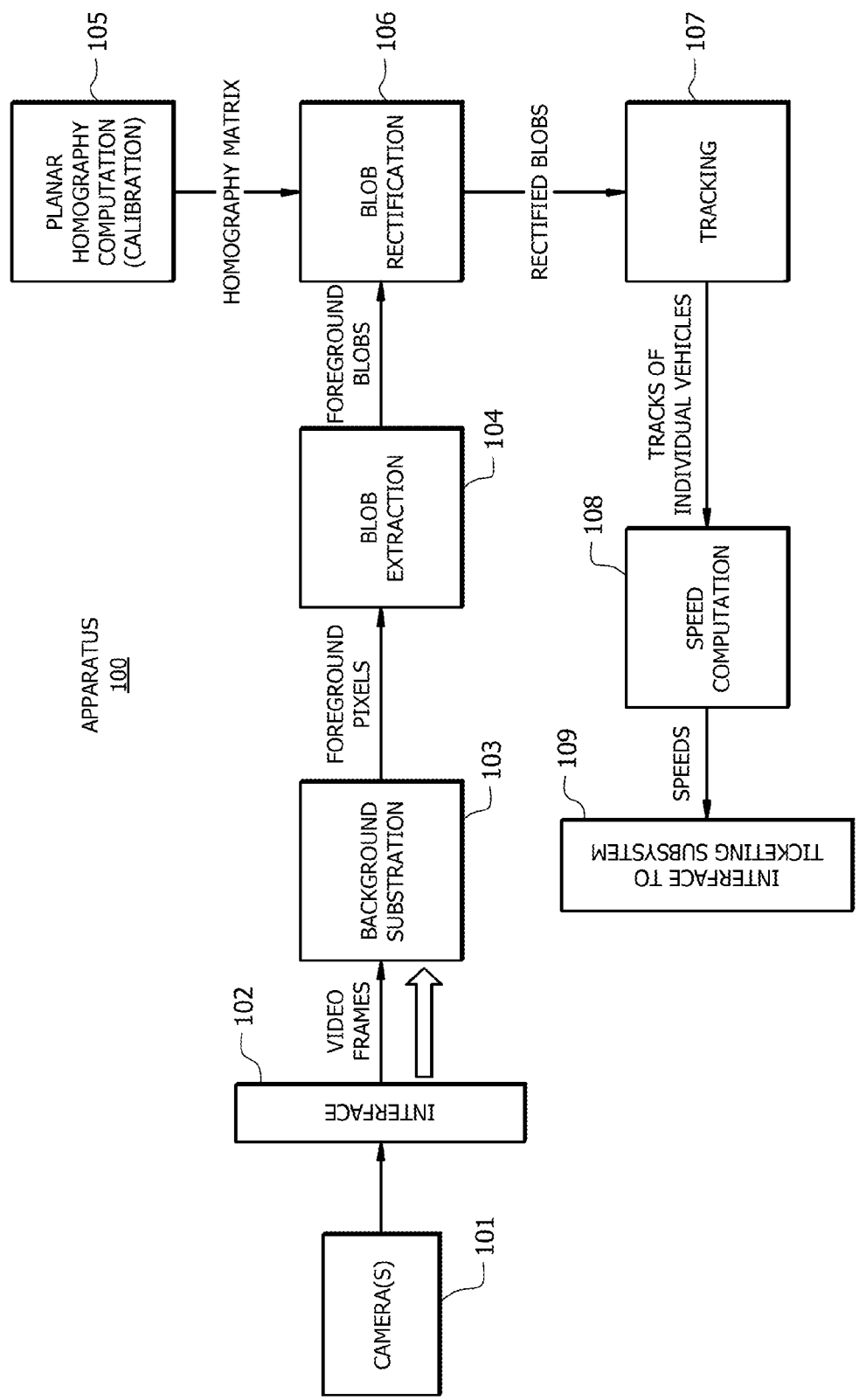
FIG. 1 is a block diagram that shows blocks of an exemplary apparatus for passively measuring the speed of moving vehicles, according to an embodiment of the invention.

Disclosed embodiments are described with reference to the attached figures, wherein like reference numerals are used throughout the figures to designate similar or equivalent elements. The figures are not drawn to scale and they are provided merely to illustrate the certain disclosed features. Several aspects described below are with reference to example applications for illustration. It should be understood that numerous specific details, relationships, and methods are set forth to provide a full understanding of the various embodiments of the invention. One having ordinary skill in the relevant art, however, will readily recognize that embodiments of the invention can be practiced without one or more of the specific details or with other methods. In other instances, well-known structures or operations are not shown in detail to avoid Obscuring disclosed features. This Disclosure is not limited by the illustrated ordering of acts or events, as some acts may occur in different orders and/or concurrently with other acts or events. Furthermore, not all illustrated acts or events are required to implement methodology in this Disclosure.

Disclosed embodiments provide apparatus, systems and methodologies for passively measuring the speed of moving vehicles, generally including deriving a homography matrix and applying a planar homography transform. System according to disclosed embodiments can compute the speed and the identify of vehicles traveling on roadways in real time by processing video frames captured through one or more cameras, such as digital video cameras. The term "roadway" as used herein refers to any type of open way suitable for vehicles, such as automobiles, including roads, streets, interstates, highways, turnpikes, or the like. Cameras are generally much cheaper as compared to radar or laser-based speed detection technology.

Unlike conventional passive camera-based methods, embodiments of the invention do not require determination of the geometric length of the moving vehicle. Moreover, embodiments of the invention are believed to be unique in several regards. For example, adaptive background subtraction is performed which is particularly helpful when the background changes significantly. Background changes can occur as a result of, for example, scene illumination changes (overcast, cloud movement, etc.), motion of pedestrians, plant and/or tree motion due to wind or rain, and/or changes in the number of stationary vehicles/objects present in the scene. The blob information is also filtered to aid in identifying vehicles. In addition, vehicle data is generally filtered to allow more robust computation of speed measurements.

FIG. 1 is a block diagram that shows blocks of an exemplary apparatus 100 for passively measuring the speed of moving vehicles, according to an embodiment of the invention. The apparatus 100 generally comprises at least one video camera 101 for acquiring a plurality of images (frames) of a roadway upon which at least one moving vehicle travels upon. The video camera(s) 101 can comprise fixed camera(s) or pan-zoom cameras, for example. The plurality of images are time stamped. Each pixel belongs to a frame (image) in the video. Frames are captured from the video camera at typically fixed time intervals, such as determined by the frame rate.

The camera 101 is generally affixed to a rigid solid support, such as a bridge or a pole. While multiple images are acquired, optics or other internal structures of the camera are generally not changed. However, to capture a vehicle identifier, such as the license plate of the vehicle, separate video cameras are generally used for the respective tasks (see FIG. 2 described below).

Each of the images obtained comprises a plurality of pixels. The image data is forwarded to an interface block 102 which converts the signals from the camera(s) 101 to a common format for the background subtraction module 103. Such a conversion can be helpful when a number of different cameras are used. For example, many commercially available cameras provide images in different formats and/or using different timing characteristics. As a result, these differences can be adjusted via the conversion. However, in embodiments where the camera(s) 101 are configured to provide a proper format for the background subtraction module 103, the apparatus 100 can be configured without interface block 102.

A computer running software code implements the steps shown in blocks 103-108 which comprise processing pixel data associated with the plurality of pixels, wherein the software code is operable for processing the pixel data. The processing comprises adaptive background subtraction on the pixel data in block 103 which outputs a plurality of foreground pixels. Adaptive background subtraction models are generally characterized by models that are changed over time depending on the dynamic nature of the background.

One particular adaptive background subtraction model comprises a Gaussian Mixture Model (GMM). In contrast to adaptive models such as GMM, conventional methods for background subtraction either use frame differencing or use a fixed frame as the background image. Blob extraction block 104 extracts a plurality of foreground blobs from the plurality of foreground pixels. In this operation, neighboring groups of pixels are clustered into blobs and noisy foreground pixels are discarded.

The plurality of blobs are rectified using blob rectification block 106. Blob rectification block 106 receives the plurality of blobs and a homography matrix derived in homography computation block 105. The blob rectification block 106, can apply the planer homography transform as defined by the homography matrix based on the shape and the location of the blobs to obtain the rectified blobs. This rectification essentially transforms the shape and location of blobs in the image plane (or in image coordinate system) to coordinates in the ground plane.

As known in the art, homography is a concept in the mathematical science of geometry and is generally defined as a relation between two figures, such that any given point in one figure corresponds to one and only one point in the other, and vice versa. In computer vision application such as embodiments of the invention, planar homography is defined in 2 dimensional space as a mapping between a point on a plane as seen from one camera, to the same point on the ground plane as seen from another camera (e.g. a second camera located at a different location).

In the various embodiments of the invention, in order to provide planar homography, one of two cameras can generally provide the ground plane itself without any projective transformations. In this embodiment, the other camera is the one generally located on a bridge or a pole.

The homography matrix is obtained by homography computation block 105 by comparing at least one known distance in the roadway (such as the spacing between lane markers) with distances between the plurality of pixels of the same roadway portion using a planar homography transform. In order to automatically identify objects with known distances in the image (e.g. lane markers), computer vision techniques, such as edge detection, can be employed. As a result, a homography matrix can be automatically computed by homography computation block 105 based on an image of a road segment.

In some embodiments, the user can also identify these objects manually to provide an input for computation of the matrix. This can be referred to as a semi-automatic approach. As defined herein and generally known in the art, a "homography matrix" can refer to a 3×3 matrix or a set of 9 decimal values organized in a table of 3 rows and 3 columns that relates pixels coordinates in two images. A "planar homography transform" as used herein and generally known in the art refers to conversion of one (coordinate system) image to another (coordinate system) image under the constraints that the two images are of planar scenes.

The blob rectification block 106 outputs a plurality of rectified blobs. The rectified blobs include pixels representing vehicle data associated with the moving vehicle. A tracking block 107 generally performs data filtering over a set of frames and determines if at least one moving vehicle is present in the rectified blobs. If so, the moving vehicle is identified from the plurality of rectified blobs.

Identifying moving vehicles from the plurality of rectified blobs provided by tracking block 107 is generally accomplished as follows. Rectified blobs that belong to a moving vehicle appear at different locations on a set of consecutive (in time) video frames. Blobs are grouped according to their properties such as position and area, into groups. Each such group potentially corresponds to a moving vehicle. The locations and area of some of these blobs will adhere to a pattern that is characteristic of a moving vehicle on a straight line with constant speed. That is, over time, the area of a blob stays roughly constant and the distance between two blob positions between consecutive frames stays roughly constant.

In some cases, the pattern can be dependent on the properties of the road segment. However, the disclosed embodiments are not limited to any single pattern and other patterns can be used. Furthermore, other properties aside from the area and location of blobs can also be used in tracking, such as the intensity values of the pixels belonging to the blobs. Blobs that do not adhere to this pattern and groups that do not contain a predetermined number of blobs considered to be adequate to potentially correspond to a moving vehicle can be discarded as being noise. The rectified blobs containing at least the predetermined number of blobs are collected as being the individual vehicle(s).

In one embodiment, the data filtering can comprise RANdom Sample Consensus (RANSAC). RANSAC is an abbreviation for "RANdom SAmple Consensus" and is an iterative method to estimate parameters of a mathematical model from a set of observed data which contains outliers. RANSAC is a non-deterministic algorithm in the sense that it produces a reasonable result only with a certain probability, with this probability increasing as more iterations are allowed. A basic assumption is that the data consists of "inliers", i.e., data whose distribution can be explained by some set of model parameters, and "outliers" which are the data that does not fit the model. In addition to this, the data can be subject to noise.

The outliers can come, e.g., from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data. In case of applying RANSAC for speed computation the model to be estimated is that of a straight line. The parameters of the model gradient and y-intersect can then be estimated by RANSAC. This gradient provides the speed of the vehicles.

Speed computation block 108 then computes the speed of the moving vehicle(s) from the tracks of individual vehicle(s) generated by tracking block 107. Since the data in the tracks of individual vehicle(s) frames are time stamped, by associating a number with each frame, it is possible to compute an accurate timestamp for each frame (and therefore for each pixel) to allow the speed of the moving vehicle(s) to be determined.

Interface block 109 provides an interface that allows interfacing to a ticketing subsystem which receives the vehicle timing and speed data from speed computation block 108. Interface block can comprise a wired or wireless interface. The computed speeds can be used for issuing tickets for speeding vehicles and video clips of speeding vehicles are stored for future reference. Unlike current ticketing systems based on laser and radar, disclosed systems use a passive camera technology making it hard for the in-car detection devices to detect the presence of such systems.

Figure 2:
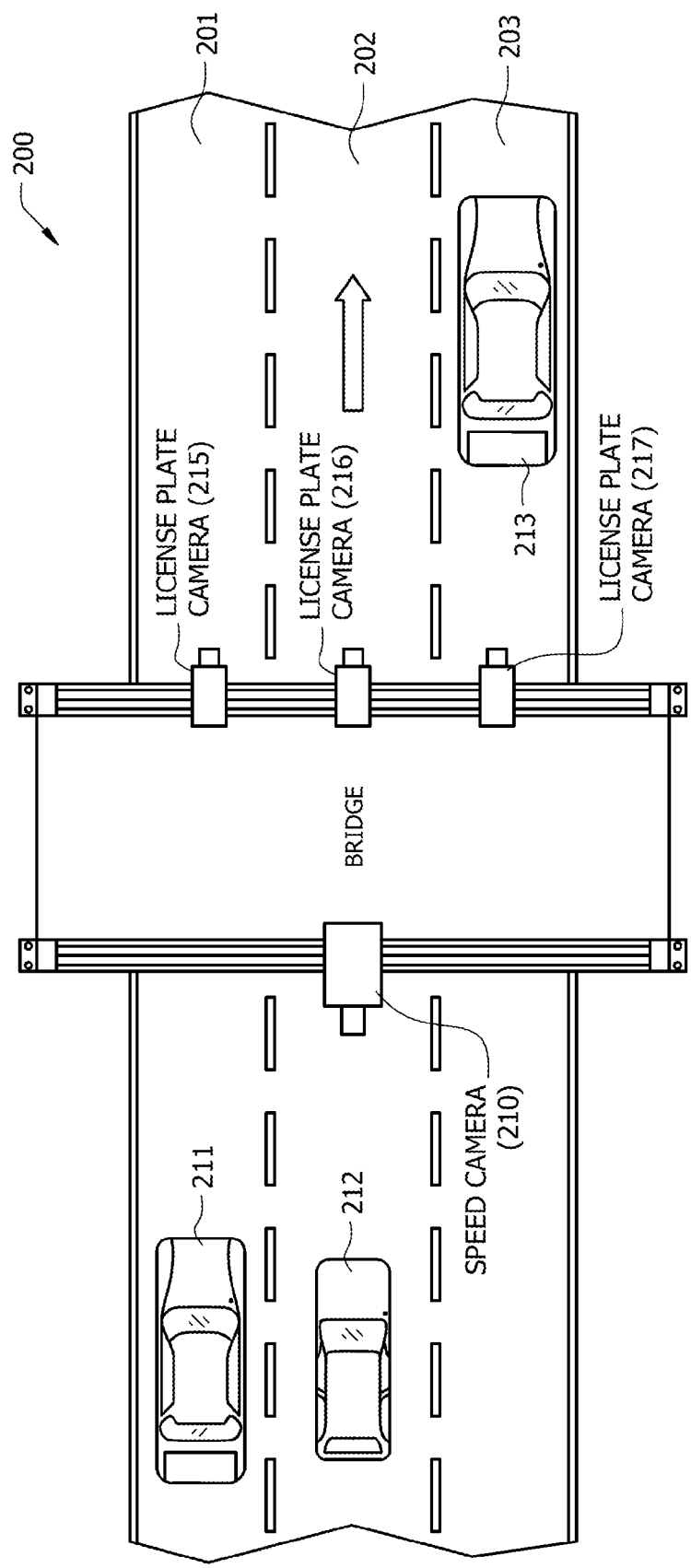
FIG. 2 is a top view depiction of a typical application scenario for an apparatus for passively measuring the speed of moving vehicles having a speed camera and a license plate camera for each lane of the roadway, according to another embodiment of the invention.

FIG. 2 is a top view depiction 200 of a typical application scenario for an apparatus for passively measuring the speed of moving vehicles having a speed camera and a license plate camera for each lane 201, 202, and 203 of the roadway, according to another embodiment of the invention. A single speed camera 210 can generally be used to obtain images sufficient to compute the speed of the moving vehicles 211, 212, 213 in multiple lanes. While multiple consecutive images are acquired, optics or other internal structures of the speed camera 210 do not generally require any change.

However, to compute the speed of the moving vehicles 211, 212, and to obtain other information that is not related to the speed, such as to capture the license plate data, separate license plate cameras 215, 216 and 217, shown one per lane 201-203, are generally used for obtain images to identify the license plate data. Although in FIG. 2 the cameras 215-217 are shown located above each lane, disclosed embodiments are not limited in this regard. In other embodiments, the cameras can be mounted on a pole or other structure alongside the roadway being monitored.

Apparatus and systems according to embodiments of the invention are capable of simultaneously monitoring multiple lanes in a roadway, and generally require only limited computing power. For example, it has been found by the Inventors that such apparatus/systems are capable of achieving reasonable accuracy even from video from an exemplary system that was configured with 320×240 pixels in resolution at 15 frames per second (fps). For such a system, the system was found to be capable of identifying and computing speeds for at least 99% of the vehicles, with the computed speeds having an error rate of less than about 1.5%.

Embodiments of the invention support speed detection for different types of vehicles, including motorcycles, cars, trucks, buses. Exemplary uses for embodiments of the invention include traffic monitoring on multiple lanes, speed calculation in multiple lanes, and ticketing based on vehicle speeds. Embodiments of the invention can be used as a low cost alternative to replace the current roadway speed camera systems based on laser and radar.

In some embodiments, an illumination source can be provided for monitoring of vehicle speeds at night. However, in other embodiments no illumination is required. In such embodiments, the headlights of the moving vehicles can be identified from the typically dark background. As a result, the foreground blobs will generally correspond to the vehicle headlights.

While various embodiments of the invention have been described above, it should be understood that they have been presented by way of example only, and not limitation. Numerous changes to the disclosed embodiments can be made in accordance with the disclosure herein without departing from the spirit or scope of this Disclosure. Thus, the breadth and scope of this Disclosure should not be limited by any of the above described embodiments. Rather, the scope of this Disclosure should be defined in accordance with the following claims and their equivalents.

Although the embodiments of the invention has been illustrated and described with respect to one or more implementations, equivalent alterations and modifications will occur to others skilled in the art upon the reading and understanding of this specification and the annexed drawings. In addition, while a particular feature disclosed herein may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this Disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An apparatus for passively measuring vehicle speed, comprising:
    at least one video camera for acquiring a plurality of images of a roadway upon which at least one moving vehicle travels upon, each of said plurality of images comprising a plurality of pixels;
    a computer for processing pixel data associated with said plurality of pixels, said computer having code operable for processing said pixel data, wherein said processing said pixel data comprises:
        performing background subtraction using an adaptive background subtraction model on said pixel data to identify a plurality of foreground pixels and to extract a plurality of blobs from said plurality of foreground pixels;

rectifying said plurality of blobs to form a plurality of rectified blobs using a homography matrix, said homography matrix obtained by comparing at least one known distance in said roadway with distances between said plurality of pixels and using a planar homography transform, identifying said moving vehicle from said plurality of rectified blobs, respective ones of said plurality of rectified blobs including vehicle data associated with said moving vehicle, and computing a speed of said moving vehicle from said vehicle data.

2. The apparatus of claim 1, wherein said code for processing said pixel data is further operable for data filtering said vehicle data to generate filtered vehicle data, wherein said computing said speed of said moving vehicle utilizes said filtered vehicle data.

3. The apparatus of claim 2, wherein said data filtering comprises RANdom Sample Consensus (RANSAC).

4. The apparatus of claim 2, wherein said data filtering discards ones of said plurality of rectified blobs that do not appear consistently in a predetermined number of consecutive frames.

5. The apparatus of claim 1, wherein said adaptive background subtraction model comprises a Gaussian Mixture Model (GMM).

6. The apparatus of claim 1, wherein said code for processing said pixel data is further operable for determining a geometric length of said moving vehicle.

7. The apparatus of claim 1, wherein said video camera is positioned above said roadway.

8. The apparatus of claim 1, wherein said video camera is positioned alongside said roadway.

9. A method for passively measuring vehicle speed, comprising:

acquiring a plurality of images of a roadway upon which at least one moving vehicle travels upon, each of said images comprising a plurality of pixels;

processing pixel data associated with said plurality of pixels, said computer having code operable for processing said pixel data, said processing comprising:

performing background subtraction using an adaptive background subtraction model on said pixel data to identify a plurality of foreground pixels and to extract a plurality of blobs from said plurality of foreground pixels;

rectifying said plurality of blobs to form a plurality of rectified blobs using a homography matrix, said homography matrix obtained by comparing at least one known distance in said roadway with distances between said plurality of pixels and using a planar homography transform, identifying at least said moving vehicle from said plurality of rectified blobs, respective ones of said plurality of rectified blobs including vehicle data associated with said moving vehicle, and computing a speed of said moving vehicle from said vehicle data.

10. The method of claim 9, further comprising data filtering said vehicle data to generate filtered vehicle data, wherein said computing said speed of said moving vehicle utilizes said filtered vehicle data.

11. The method of claim 10, wherein said data filtering comprises RANdom Sample Consensus (RANSAC).

12. The method of claim 10, wherein said data filtering discards ones of said plurality of rectified blobs that do not appear consistently in a predetermined number of consecutive frames.

13. The method of claim 9, wherein said adaptive background subtraction model comprises a Gaussian Mixture Model (GMM).

14. The method of claim 9, wherein said processing further comprises determining a geometric length of said moving vehicle.

15. The method of claim 9, wherein said video camera is positioned above said roadway.

16. The method of claim 9, wherein said video camera is positioned alongside said roadway.

* * * * *